July 1, 1952     J. H. O'BRIEN     2,601,829
FLUID PUMP
Filed Nov. 10, 1947     2 SHEETS—SHEET 1
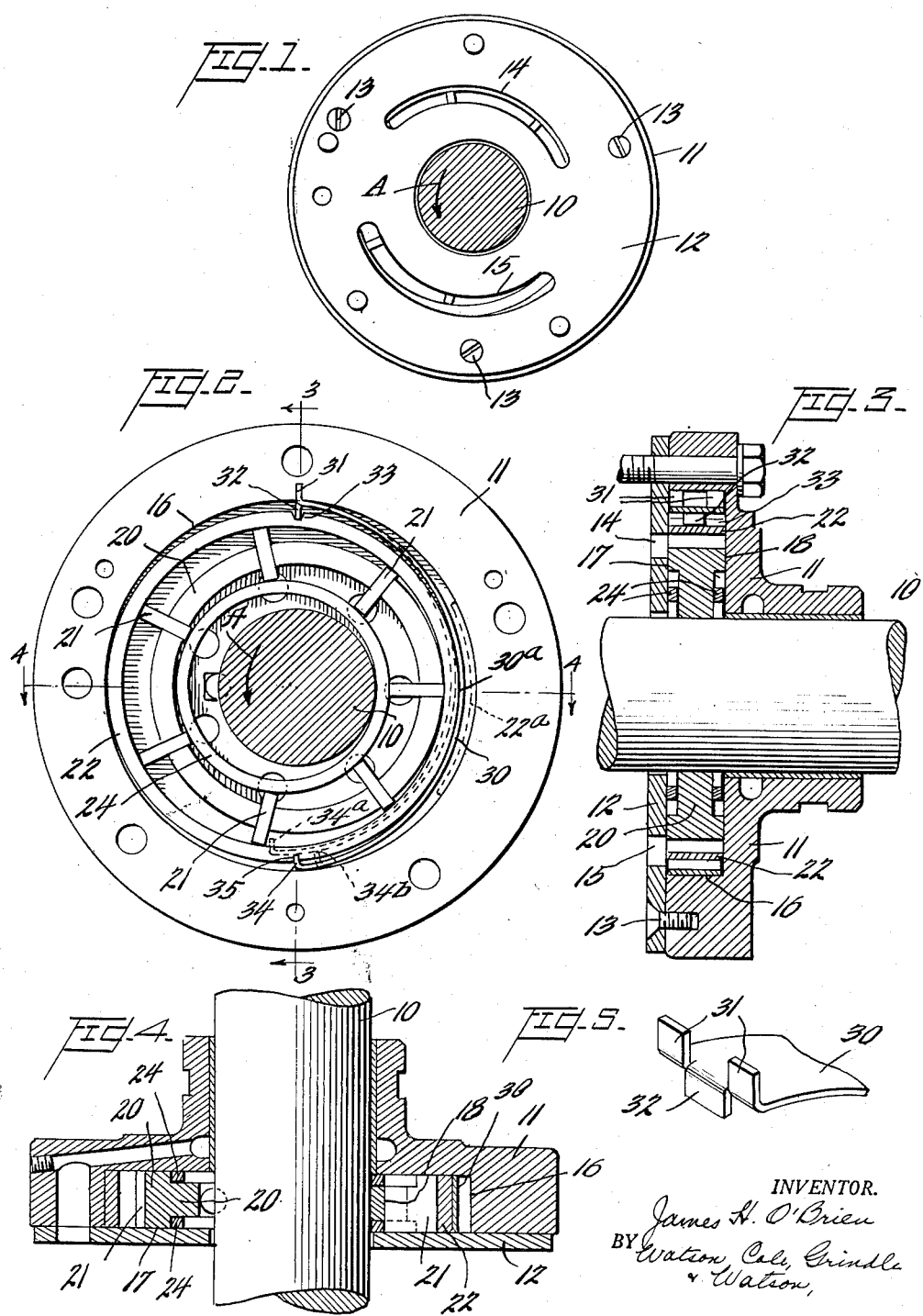
INVENTOR.
James H. O'Brien
BY Watson, Cole, Grindle & Watson,
ATTORNEYS July 1, 1952 J. H. O'BRIEN 2,601,829
FLUID PUMP
Filed Nov. 10, 1947 2 SHEETS—SHEET 2
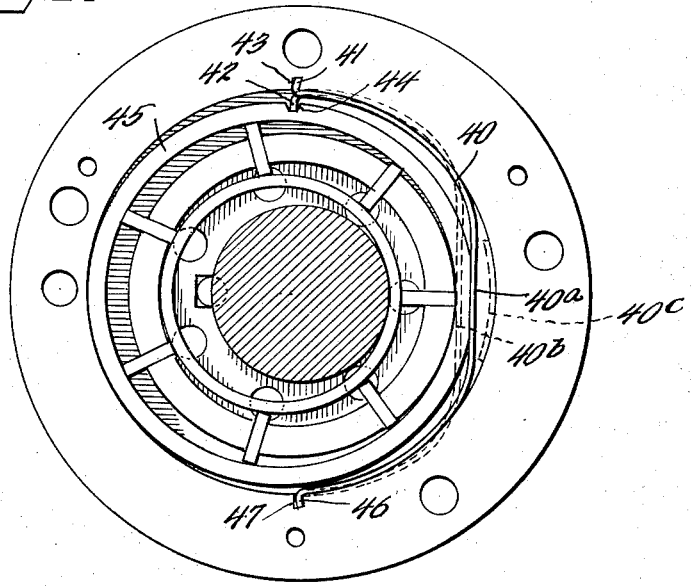
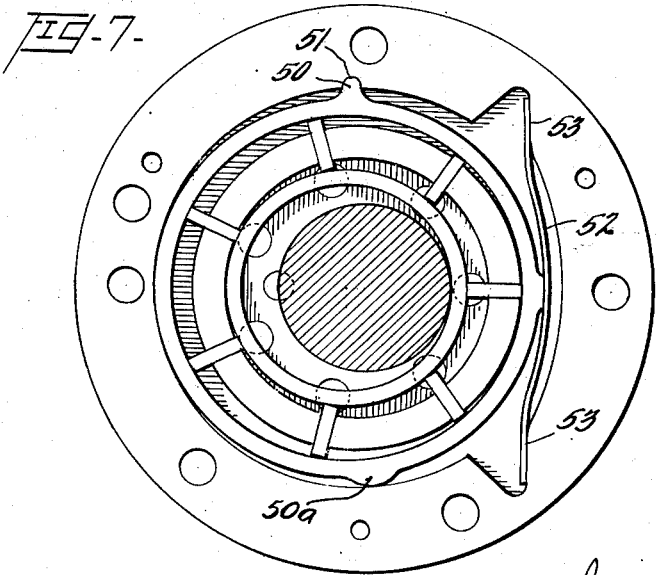
INVENTOR.
James H. O'Brien
BY Watson, Cole, Grindle
& Watson,
ATTORNEYS Patented July 1, 1952

2,601,829

UNITED STATES PATENT OFFICE 2,601,829

FLUID PUMP

James H. O'Brien, Detroit, Mich., assignor to Packard Motor Car Company, Detroit, Mich., a corporation of Michigan Application November 10, 1947, Serial No. 785,163

6 Claims. (Cl. 103—120)

The present invention relates to fluid pumps and particularly to fluid pumps of the rotary type.

Rotary fluid pumps of various designs and capacities have heretofore been employed for many purposes. Where the pump driving means operates at a fairly uniform rate it is easily possible to devise a rotary pump which will deliver fluid under the pressure and in the quantity desired. When, however, the rotary fluid pump is associated with and driven by power derived from a prime mover which operates at widely varying speeds, and it is necessary that its fluid output be delivered at substantially constant pressure even though the pump output requirements vary widely, the problem is somewhat more difficult.

Thus where fluid such as oil under pressure is to be utilized to supply power for the actuation of an automatic transmission or other mechanism associated with a motor vehicle, and the pump is operatively connected to and takes power from the prime mover of the motor vehicle, it obviously will be driven at speeds which vary from a very low speed, when the motor is idling, to a very high speed, as when the motor vehicle is moving rapidly. Unless automatic means for varying the pump output is employed the fluid delivered will vary tremendously in volume and, unless pressure relief means is provided, will vary greatly in pressure. Wide pressure variations are particularly undesirable when the mechanism to be actuated by fluid pressure is an automatic transmission and in any event it is undesirable to utilize pressure relief devices to prevent the building up of unduly high pressures since heat is developed in any case where the pump is caused to deliver large quantities of excess liquid through such pressure relief means, the amount of heat thus generated being frequently quite substantial.

It has heretofore been suggested that a fluid pump which must be used in association with a prime mover which varies widely in speed of operation be of the self-adjusting type, adapted to deliver liquid at a substantially constant pressure at all speed of operation, and regardless of the fact that the output requirements vary widely. One form of pump having such characteristics, and which has been found to operate satisfactorily over long periods of time, comprises essentially, in addition to the rotary drive shaft which may take its power from any prime mover, a casing defining a chamber which encircles the drive shaft, a rotor within the chamber and keyed or otherwise fixed to the drive shaft, such rotor carrying a plurality of radially disposed and radially movable vanes, and a cylinder within the chamber and encircling the rotor, the outer ends of the vanes being in constant contact with the cylindrical inner face of the cylinder. The cylinder is of less diameter than the chamber in which it is housed and may be moved transversely of the drive shaft and casing so that it may be caused to occupy a position truly concentric with the axis of the drive shaft or any one of a number of positions in which it is eccentric to the drive shaft. A resilient element is provided in association with the cylinder and casing said element being positioned to act upon the cylinder and to normally urge that element toward its position of greatest eccentricity within the chamber.

With an arrangement such as that just briefly described the pressure built up in the pump chamber, which chamber lies between the inner face of the cylinder and the cylindrical outer face of the rotor, opposes the action of the resilient means which continuously acts upon the cylinder and, as the speed of rotation of the drive shaft increases, thus causing increase in pressure in the pumping chamber and in the delivery port of the pump, the cylinder is forced, against the action of the resilient means, toward a position in which it will be truly concentric with the drive shaft and the outer surface of the rotor. If the rotor speed is increased sufficiently, and fluid under pressure from the delivery port is not needed, the cylinder quickly assumes a position of true concentricity and all pumping action ceases. When the delivery of fluid under pressure is desired the cylinder will occupy one of its many possible eccentric positions. In any case, however, the pressure of the fluid in the discharge port of the pump will vary very little and the adjustment of the cylinder in order to make this constant delivery pressure possible is effected instantaneously from time to time to immediately compensate for variations in speed of the driving shaft and variations in the output requirements.

This invention deals particularly with the means for supporting the cylinder and for normally urging it into eccentric position. Heretofore the cylinder has usually been supported for pivotal movement about a fixed axis adjacent the cylindrical wall of the fluid chamber and a resilient device in the nature of a helical spring has been disposed at a point remote from the axis of pivotal swinging movement of the cylinder, having been generally mounted upon the casing and directed to act along the line passing through the axis of the drive shaft.

The improved construction comprises a resilient device which, in all of its forms, comprises a spring element adapted to be inserted into the casing in such manner that it will bear against the cylinder and urge it toward its position of greatest eccentricity. The spring element, however, which is in the nature of a leaf spring, is deformable by the cylinder when the fluid pressure builds up and eventually is deformed to the extent necessary to allow the cylinder to reach a position of concentricity around the drive shaft. In a preferred form of the device the spring element comprises a member which not only tends to maintain the cylinder in its position of greatest eccentricity but likewise comprises a support for the cylinder and defines the axis about which the cylinder is caused to rock in its movements of automatic adjustment. The resilient member is preferably in the form of a leaf spring of substantial length, curved in such manner as to be received within the chamber defined by the casing and to bear against the cylinder at all times with the desired amount of pressure. The arrangement is simpler than any means of generally similar character heretofore suggested, less costly to construct and in the end permits the use of a casing of smaller outside diameter than those heretofore employed, an advantage of considerable importance in certain installations. The resilient element may be modified in its details of construction and in the accompanying drawings several forms are shown, all of which will operate effectively.

It will be appreciated that still other embodiments of the invention may be devised in adapting the same to types of pumps which vary slightly in the design and arrangement of their component elements.

In the drawings:

Figure 1 is an elevation of the pump casing, as viewed from one side, the drive shaft being shown in section;

Figure 2 is an elevation of the pump with the cover plate of the casing removed and upon a somewhat larger scale;

Figure 3 is a section on line 3—3 of Figure 2;

Figure 4 is a section on line 4—4 of Figure 2;

Figure 5 is a perspective view of one end of the spring element utilized in this embodiment of the invention;

Figure 6 is a view similar to Figure 2 but showing a modified form of spring element disposed within the cylinder; and Figure 7 is a similar view, showing a still further modification of the invention.

The drive shaft of the pump is indicated at 10 and this shaft may, for instance, be one which takes power for its operation from the prime mover of an automotive vehicle and the speed of rotation of which will therefore vary widely. The pump casing which encircles the shaft comprises a stationary main member 11 and a cover plate 12 secured to the main member by screws or bolts, such as indicated at 13. Formed in the cover plate 12 are elongated inlet and discharge ports 14 and 15, respectively, of conventional character in pumps of radial vane type. The main member 11 and cover plate 12 of the casing define a chamber having a cylindrical wall 16 concentric with the axis of shaft 10 and cylinder side walls 17 and 18 disposed normally to the axis of the shaft 10. Within the shaft encircling chamber thus defined by the casing is a rotor 20 which is keyed to the shaft and which is provided with a series of radial slots disposed equidistantly around its periphery and each of which slidably retains a vane 21. Encircling the rotor is the cylinder 22, the outer edges of the several vanes 21 being adapted to contact with the inner cylindrical surface of cylinder 22 at all times. To maintain such contact rings 24 are provided, these rings being housed in annular recesses formed in the sides of the rotor, the outer diameter of each ring being such as to cause it to maintain constant engagement with the inner edges of all of the vanes when the outer edges of the several vanes are in contact with the cylinder 22.

The outer diameter of cylinder 22 is less than the inner diameter of the cylindrical surface 16 of the chamber defined by the casing and hence may be shifted bodily in a plane transverse to the axis of shaft 10, being shown in Figure 2 of the drawings to have been moved to a position where its outer periphery is in contact with the face 16 of the chamber at a point which lies directly to the left of the shaft axis, leaving a space of varying width between its outer face and the inner face of the chamber which extends around the remainder of the cylinder, this space being of greatest width at a point diametrically opposite the point of contact of cylinder and casing wall. A spring element normally maintains the cylinder in the position in which it is shown and this element is indicated at 30 in the drawings, being in the form of a generally semicircular leaf spring which lies in the space of varying width just described, between the outer periphery of the cylinder and the inwardly facing cylindrical surface of the casing. One end of resilient member 30 is affixed to the casing and the other end to the cylinder. Thus that end of member 30 which is shown to be uppermost in Figure 2 is so formed, as shown clearly in Figure 5, that it embodies two upwardly or outwardly turned flange portions 31 and an inwardly turned flange portion 32, the flanges 31 and 32 being formed by slitting the spring longitudinally and bending the tongues thus formed. The outwardly turned flanges 31 are received with a tight fit in a recess formed in the casing, as indicated in Figure 3, and the member 30 may thus be said to be firmly anchored at this end. The downwardly turned tab or flange 32 is received within a notch 33 formed in the outer periphery of the cylinder and the lower edge of this flange 32 comprises a pivot about which the cylinder 22 may rock.

The opposite or lower end of the spring member 30 is inturned or upturned as indicated at 34 in Figure 2 and enters notch 35 formed in the cylinder 22. The spring element 30 is so formed in manufacture that, if flanges 31 were to be maintained in the positions in which they are shown in Figure 2, and the cylinder 22 removed, the spring would contract until its terminal end 34 would occupy the position 34a in which that end of the spring is shown in dotted lines. The spring as it is thus shown in full lines in Figure 2 is in a distorted condition and normally tends to swing cylinder 22 to the position in which it is shown, rocking the cylinder about an axis at the end of the flange 32. If the shaft 10 be rotated in the direction of the arrow A (Figure 2) pressure in the outlet port 15 and in the portion of the chamber which is serving as a pump chamber will be increased and, as the speed of rotation of the shaft increases, the action of the spring, which always engages the cylinder 22 at the point or minor area 30a, will be overcome, the spring being gradually distorted and its shape changed from that non-cylindrical original shape in which it is shown in Figure 2, the somewhat flattened mid-portion of the spring being eventually rendered approximately cylindrical by being pinched between the outer cylindrical surface of the cylinder 22 and the inner cylindrical surface of the chamber in the casing, the position of the central portion of the spring when fully deflected being indicated in dotted lines at 22a in Figure 2. After the spring has been thus distorted its lower end 34 will have been caused to move from the position in which it is shown in full lines in Figure 2 to the position indicated at 34b in this figure, in dotted lines, the cylinder when the spring has been fully deflected being substantially concentric with the shaft, the rotor merely rotating idly with the cylinder in this condition and no fluid issuing from the pump.

In the form of the invention shown in Figure 6 the casing, shaft, rotor, cylinder and vanes are as before but a somewhat modified form of spring member being disclosed. Here the spring member 40 has at its upper terminal end two upturned flanges 41 and a downturned flange 42, as in the case of the first form of spring element described, the upturned flanges 41 extending with a loose fit into a notch 43 formed in the casing wall and the downturned flange 42 loosely extending into a notch 44 formed in the outer surface of the cylinder 45. At its opposite end, however, the spring element 40 is provided with an outwardly turned flange 46 which extends into a notch 47 formed in the casing wall. Spring 40 has a somewhat flattened mid-section 40a and is shown in distorted position, this section 40a normally occupying a position such as that indicated in dotted lines at 40b when the spring is released and free of tension. The building up of pressure due to high speed rotation of the pump rotor will cause the cylinder 45 to gradually force the spring into an approximately cylindrical shape so that it lies rather closely against the outer cylindrical face of the cylinder, making close contact throughout the length of the spring. The mid-portion 40a of the spring occupies some such position as that indicated at 40c when the spring has been deflected to the utmost. When in this position the mid-portion of the spring is slightly spaced from and out of contact with the inner wall of the casing, both ends of the spring being anchored and unlike that form of the invention first described in this respect. The cylinder slidably rests upon spring 40, the point or area of contact being just above the downturned end 46 of the spring. The cylinder is thus maintained at an approximately constant elevation.

In the form of the invention illustrated in Figure 7 the casing, shaft, rotor, vanes and cylinder remain unchanged except in that the cylinder is provided with an outwardly projecting portion 50 with a rounded end which is received within a correspondingly shaped recess 51 formed in the wall of the casing, the cylinder being thus constrained to move about an axis as before, in the operation of the pump. The cylinder is provided with a curved projection or foot 50a, diametrically opposed to projection 50, which slidably engages the wall of the chamber and which maintains the cylinder at substantially a constant elevation. In this form of the invention the substantially semi-cylindrical type of spring is replaced by a spring member 52 which is approximately straight, and the ends of which rest upon shoulders 53 formed in the wall of the casing. The central portion of the spring element bridges the shoulders 53 and is deflected as the cylinder moves toward the right under the influence of increasing fluid pressure. It acts substantially in the manner of the spring elements heretofore described but engages the cylinder at only one point and does not provide a pivot or fulcrum point about which the cylinder may swing or rock. Naturally it is possible to devise other forms of the invention to suit special circumstances, as occasion may require.

Having thus described the invention, what is claimed as new and desired to be secured by Letters Patent is:

1. In a rotary pump, in combination, a drive shaft, a casing defining a chamber encircling the drive shaft, a rotor mounted on the shaft, a series of vanes mounted upon the rotor, a cylinder within the chamber and encircling the rotor, the outer ends of the vanes engaging the inner face of the cylinder and the cylinder being of less diameter than the chamber so as to be movable bodily therein transversely of the drive shaft and rotor, and a leaf spring within the chamber and disposed to normally maintain the cylinder in contact with the chamber wall and eccentric to the axis of the shaft, said spring being deformed by the ring as the ring shifts in response to increase in fluid pressure, one end of said spring having a part interlocked with said casing and a part pivotally engaging said cylinder, and the other end thereof being interlocked with said cylinder.

2. A fluid pump of the rotary type comprising, a rotor rotatable about a fixed axis, radially movable vanes carried by the rotor, a cylinder encircling the rotor and engaging the vanes, a casing defining a chamber having a cylindrical wall concentric with the rotor and of greater diameter than the cylinder so that the cylinder is shiftable bodily in said chamber, and a non-cylindrical leaf spring disposed between the outer surface of the cylinder and the cylindrical inner surface of the chamber, said spring extending approximately half way around the cylinder and having one end anchored in the casing and the other end in the cylinder, the spring being distorted and normally tending to maintain the cylinder in an eccentric position, a portion of the spring at that end which is anchored to the casing projecting inwardly and comprising a fulcrum about which the cylinder may rock, the cylinder being recessed to receive the fulcrum.

3. In a rotary pump, in combination, a drive shaft, a casing defining a chamber encircling the drive shaft, a rotor mounted on the shaft, a series of vanes movably mounted upon the rotor, a cylinder within the chamber and encircling the rotor, the outer ends of the vanes engaging the inner face of the cylinder and the cylinder being of less diameter than the chamber, and an elongated arcuate spring member disposed between the mutually facing cylindrical surfaces of the cylinder and chamber, said spring making contact with the cylinder at spaced points and having one end thereof interlocked with the casing, so as to support the cylinder within the chamber for bodily movement transversely of the drive shaft, and normally urging said cylinder toward a position of maximum eccentricity with respect to said shaft.

4. In a rotary pump, in combination, a drive shaft, a casing defining a chamber encircling the drive shaft, a rotor mounted on the shaft, a series of vanes movably mounted upon the rotor, a cylinder within the chamber and encircling the rotor, the outer ends of the vanes engaging the inner face of the cylinder and the cylinder being of less diameter than the chamber, and an elongated arcuate leaf spring member disposed between the mutually facing cylindrical surfaces of the cylinder and chamber, said spring making contact with the cylinder at spaced points and making contact at an intermediate point with the casing, so as to support the cylinder within the chamber for bodily movement transversely of the drive shaft, and normally urging said cylinder toward a position of maximum eccentricity with respect to said shaft, one end of said leaf spring being interlocked with said casing.

5. In a rotary pump, in combination, a drive shaft, a casing defining a chamber encircling the drive shaft, a rotor mounted on the shaft, a series of vanes movably mounted upon the rotor, a cylinder within the chamber and encircling the rotor, the outer ends of the vanes engaging the inner face of the cylinder and the cylinder being of less diameter than the chamber, and an elongated arcuate leaf spring disposed between the mutually facing cylindrical surfaces of the cylinder and chamber, one end of said spring being interlocked with said casing and also engaging the cylinder, the other end underlying and engaging the cylinder at its lowermost point, and an intermediate portion engaging the cylinder only, the spring serving to support the cylinder within the chamber for bodily movement transversely of the drive shaft, and normally urging said cylinder toward a position of maximum eccentricity with respect to said shaft.

6. The combination set forth in claim 5 in which the cylinder is externally notched at one point and a part of that end of the spring which is interlocked with the casing projects into said notch, the cylinder thus being constrained to pivot about said spring part as a fulcrum.

JAMES H. O'BRIEN.

REFERENCES CITED

The following references are of record in the file of this patent:

UNITED STATES PATENTS

| Number | Name | Date |
|---|---|---|
| 1,779,757 | Streckert | Oct. 28, 1930 |